US006256313B1

(12) United States Patent
Chung (10) Patent No.: US 6,256,313 B1
(45) Date of Patent: Jul. 3, 2001

(54) TRIPLET ARCHITECTURE IN A MULTI-PORT BRIDGE FOR A LOCAL AREA NETWORK

(75) Inventor: David H. Chung, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/050,750

(22) Filed: Mar. 30, 1998

Related U.S. Application Data (63) Continuation-in-part of application No. 08/590,125, filed on Jan. 23, 1996, now Pat. No. 5,764,895, which is a continuation-in-part of application No. 08/371,499, filed on Jan. 11, 1995, now Pat. No. 5,857,075.
(60) Provisional application No. 60/059,171, filed on Sep. 17, 1997.

(51) Int. Cl.[7] ................................................. H04L 12/28
(52) U.S. Cl. ........................ 370/401; 370/392; 370/413
(58) Field of Search ..................... 370/230, 236, 370/401, 413, 389, 392, 412, 474, 475, 470

(56) References Cited

U.S. PATENT DOCUMENTS

| H586 | 2/1989 | Kun | 370/94 |
|---|---|---|---|
| Re. 33,426 | 11/1990 | Sugimoto et al. | 370/85.14 |

(List continued on next page.)

FOREIGN PATENT DOCUMENTS

| 0 397 188 A2 | 11/1990 | (EP) | H04L/12/46 |
|---|---|---|---|
| 0597789 A1 | 5/1994 | (EP) | H04L/12/46 |
| 0 609 626 A2 | 8/1994 | (EP) | H04L/12/50 |
| 0 642 246 A2 | 3/1995 | (EP) | H04L/29/06 |
| 0785698 A2 | 7/1997 | (EP) | H04Q/11/04 |
| WO 96/13922 | 5/1996 | (WO) | H04L/12/44 |
| WO 96/21302 | 7/1996 | (WO) | H04L/12/46 |
| WO 97/18657 | 5/1997 | (WO) | H04L/12/18 |

OTHER PUBLICATIONS

William Stallings, "Internetworking: A Guide for the Perplexed," Telecommunications, North American Edition, Sep. 1989, pp. 25–30.

Bob Stewart and Bill Hawe, "Local Area Network Applications," Telecommunications, North American Edition, Sep. 1984, pp. 96f–96j, and 96u.

(List continued on next page.)

*Primary Examiner*—Huy D. Vu
*Assistant Examiner*—Dung Trinh
(74) *Attorney, Agent, or Firm*—Haverstock & Owens LLP (57) ABSTRACT

A technique for controlling the flow of among the ports of a multi-port bridge. The bridge includes a memory for storing packets and a plurality of ports. Each port includes a receive buffer, a transmit buffer and a "triplet" buffer. A data packet is received by the receive buffer of a port. As the packet is still being received, a look-up table is utilized to identify the appropriate destination port for the packet. A result of the look-up is a "triplet" which includes three fields: a first field containing the identification of the source port, a second field containing the identification of the destination port, and a third field containing a starting address assigned to the incoming packet in the memory. The triplet is placed upon the communication bus a first time. If the destination port is available to receive the packet directly from the source port, the destination port receives the packet simultaneously as the packet is stored in the memory. Otherwise, the triplet is placed on the communication bus a second time after the packet is stored in the memory. The destination port stores the triplet in its triplet buffer. Then, when the destination port is available, the destination port retrieves the packet from the memory for transmission.

17 Claims, 6 Drawing Sheets

U.S. PATENT DOCUMENTS

| | | | |
|---|---|---|---|
| 3,735,357 | 5/1973 | Maholick et al. | 340/172.5 |
| 4,213,201 | 7/1980 | Gagnier et al. | 370/62 |
| 4,589,120 | 5/1986 | Mendala | 375/117 |
| 4,597,078 | 6/1986 | Kempf | 370/94 |
| 4,627,052 | 12/1986 | Hoare et al. | 370/88 |
| 4,706,081 | 11/1987 | Hart et al. | 340/825.03 |
| 4,707,827 | 11/1987 | Bione et al. | 370/85 |
| 4,710,769 | 12/1987 | Friedman et al. | 340/825.03 |
| 4,715,030 | 12/1987 | Koch et al. | 370/85 |
| 4,718,060 | 1/1988 | Oguchi et al. | 370/85 |
| 4,723,311 | 2/1988 | Moustakas et al. | 455/612 |
| 4,727,537 | 2/1988 | Nichols | 370/85 |
| 4,727,538 | 2/1988 | Furchtgott et al. | 370/85 |
| 4,737,953 | 4/1988 | Koch et al. | 370/94 |
| 4,744,078 | 5/1988 | Kowalczyk | 370/85 |
| 4,797,879 | 1/1989 | Habbab et al. | 370/3 |
| 4,823,338 | 4/1989 | Chan et al. | 370/85 |
| 4,849,962 | 7/1989 | Morimoto et al. | 370/29 |
| 4,878,216 | 10/1989 | Yunoki | 370/60 |
| 4,901,308 | 2/1990 | Deschaine | 370/58.1 |
| 4,905,219 | 2/1990 | Barr et al. | 370/4 |
| 4,933,937 | 6/1990 | Konishi | 370/85.13 |
| 4,935,922 | 6/1990 | Wicklund et al. | 370/60 |
| 5,016,159 | 5/1991 | Maruyama | 364/200 |
| 5,020,052 | 5/1991 | DePrycker et al. | 370/60 |
| 5,027,350 | 6/1991 | Marshall | 370/85.13 |
| 5,048,014 | 9/1991 | Fischer | 370/85.5 |
| 5,107,489 | 4/1992 | Brown et al. | 370/58.2 |
| 5,119,367 | 6/1992 | Kawakatsu et al. | 370/54 |
| 5,140,585 | 8/1992 | Tomikawa | 370/60.1 |
| 5,151,897 * | 9/1992 | Suzuki | 370/85.13 |
| 5,151,994 | 9/1992 | Wille et al. | 395/800 |
| 5,166,926 | 11/1992 | Cisneros et al. | 370/60 |
| 5,184,346 | 2/1993 | Kozaki et al. | 370/60 |
| 5,229,993 | 7/1993 | Foudriat et al. | 370/85.3 |
| 5,241,550 | 8/1993 | Kusano | 371/71 |
| 5,243,699 | 9/1993 | Nickolls et al. | 395/275 |
| 5,274,631 | 12/1993 | Bhardwaj | 370/60 |
| 5,307,345 | 4/1994 | Lozowick et al. | 370/61 |
| 5,339,316 | 8/1994 | Diepstraten | 370/85.13 |
| 5,353,353 | 10/1994 | Vijeh et al. | 380/29 |
| 5,379,289 | 1/1995 | DeSouza et al. | 370/85.13 |
| 5,379,296 | 1/1995 | Johnson et al. | 370/60 |
| 5,386,413 | 1/1995 | McAuley et al. | 370/54 |
| 5,390,173 * | 2/1995 | Spinney et al. | 370/60 |
| 5,404,459 | 4/1995 | Gulick et al. | 395/275 |
| 5,410,754 | 4/1995 | Klotzbach et al. | 370/85.13 |
| 5,430,762 | 7/1995 | Vijeh et al. | 375/211 |
| 5,432,511 | 7/1995 | Sadjadian et al. | 341/61 |
| 5,434,861 | 7/1995 | Pritty et al. | 370/85.8 |
| 5,442,578 | 8/1995 | Hattori | 364/746.1 |
| 5,446,726 | 8/1995 | Rostoker et al. | 370/17 |
| 5,448,565 | 9/1995 | Chang et al. | 370/85.13 |
| 5,457,446 | 10/1995 | Yamamoto | 340/825.24 |
| 5,457,679 | 10/1995 | Eng et al. | 370/16 |
| 5,481,540 | 1/1996 | Huang | 370/85.13 |
| 5,487,067 | 1/1996 | Matsushige | 370/85.7 |
| 5,502,748 | 3/1996 | Wilkinson | 375/354 |
| 5,506,902 | 4/1996 | Kubota | 380/9 |
| 5,515,376 | 5/1996 | Murthy et al. | 370/85.13 |
| 5,521,913 | 5/1996 | Gridley | 370/58.2 |
| 5,522,059 | 5/1996 | Marushima et al. | 395/476 |
| 5,530,434 | 6/1996 | Kanda | 340/825.04 |
| 5,541,923 | 7/1996 | Kato | 370/85.1 |
| 5,550,826 | 8/1996 | Tanaka et al. | 370/85.8 |
| 5,560,038 | 9/1996 | Haddock | 395/800 |
| 5,565,929 | 10/1996 | Tanaka | 348/565 |
| 5,568,476 | 10/1996 | Sherer et al. | 370/60 |
| 5,568,643 | 10/1996 | Tanaka | 395/739 |
| 5,570,330 | 10/1996 | Okawa | 369/44.32 |
| 5,570,466 | 10/1996 | Oechsle | 395/200.15 |
| 5,598,161 | 1/1997 | Yamada | 341/159 |
| 5,598,278 | 1/1997 | Tanaka et al. | 386/96 |
| 5,598,391 | 1/1997 | Mukawa | 369/54 |
| 5,598,581 * | 1/1997 | Daines et al. | 395/872 |
| 5,600,664 | 2/1997 | Hayashi | 371/43 |
| 5,602,851 | 2/1997 | Terashita et al. | 370/403 |
| 5,608,730 | 3/1997 | Osakabe et al. | 370/471 |
| 5,608,879 | 3/1997 | Cooke | 395/290 |
| 5,621,725 | 4/1997 | Kawamura et al. | 370/43 |
| 5,640,399 | 6/1997 | Rostoker et al. | 370/392 |
| 5,721,927 | 2/1998 | Baraz et al. | 395/705 |
| 5,761,435 | 6/1998 | Fukuda et al. | 395/200.68 |
| 5,802,047 | 9/1998 | Kinoshita | 370/359 |
| 5,923,654 | 7/1999 | Schnell | 370/390 |
| 5,949,788 | 9/1999 | Friedman et al. | 370/431 |
| 6,018,526 | 1/2000 | Liu et al. | 370/401 |

OTHER PUBLICATIONS

Bob Stewart, and Bill Hawe, and Alan Kirby, "Local Area Network Connection," Telecommunications, North American Edition, Sep. 1984, pp. 54–55, 58–59 and 66.

National Semiconductor, databook, "DP83934 Sonic™–T Systems–Oriented Network Interface Controller with Twisted Pair Interface" pp. 1–457 to 1–458, 1–468 to 1–477, 1–480, 1–512, 1–527–to 1–529.

NEC Data Sheet, MOS Integrated Circuit, $\mu$PD4516421, 4516821, 4516161 16M–bit Synchronous DRAM, Nov. 1995.

Printout of internet website http://www.ti.com/sc/docs/network/tswitch/product.htm#3150al, ThunderSWITCH Product Information, "ThunderSWITCH Product Descriptions," Feb. 1997.

Texas Instruments Product Preview SPWS027, "TNETX3150 ThunderSWITCH™ 15–Port 10–/100–MBIT/S Ethernet™ Switch," pp. 1–85, Sep. 1996.

* cited by examiner

TRIPLET ARCHITECTURE IN A MULTI-PORT BRIDGE FOR A LOCAL AREA NETWORK

This is a continuation-in-part of U.S. patent application Ser. No. 08/590,125 filed on Jan. 23, 1996, U.S. Pat. No. 5,764,895, which is a continuation-in-part of U.S. patent application Ser. No. 08/371,499, filed on Jan. 11, 1995, U.S. Pat. No. 5,857,075. The contents of U.S. patent application Ser. No. 08/590,125 and the contents of U.S. patent application Ser. No. 08/371,499 are hereby incorporated by reference. This application claims the benefit of U.S. Provisional Application Ser. No. 60/059,171, filed Sep. 17, 1997.

FIELD OF THE INVENTION

The invention relates to a multi-port bridge for a local area network. More particularly, the invention relates to controlling flow of data packets among the ports of a multi-port bridge.

BACKGROUND OF THE INVENTION

Nodes of a local area network (LAN) are typically interconnected by a shared transmission medium. The amount of data traffic that the shared transmission medium can accommodate, however, is limited. For example, only one node at a time can successfully transmit data to another node over the shared transmission medium. If two or more nodes simultaneously attempt to transmit data, a data collision occurs, which tends to corrupt the data being transmitted. Thus, nodes that share a transmission medium are considered to be in a same collision domain.

Figure 1:
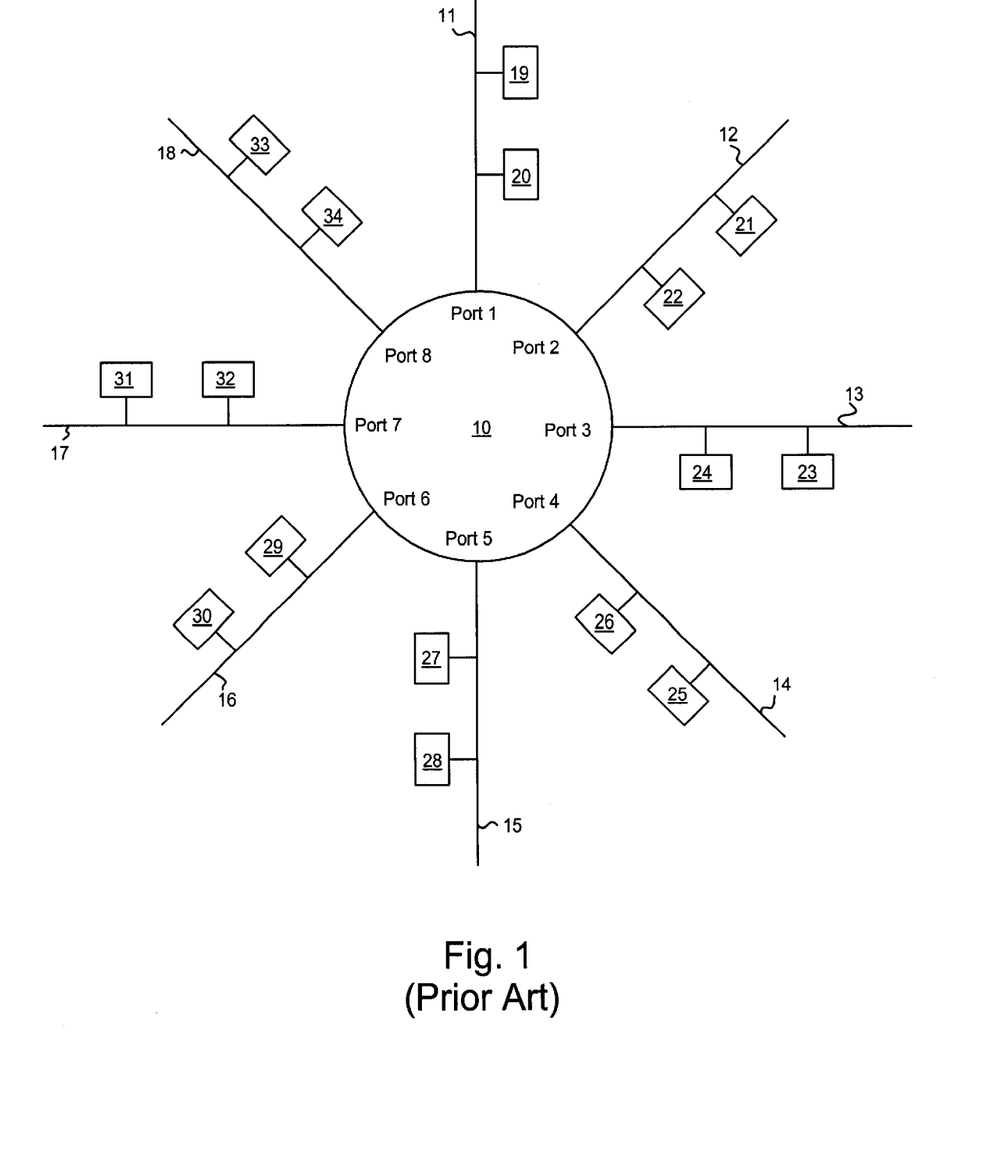
FIG. 1 illustrates a conventional local area network (LAN) including a multi-port bridge.

A multi-port bridge allows simultaneous communication between nodes of the LAN by segmenting the LAN into multiple collision domains (also referred to as network segments), each segment having a corresponding transmission medium. FIG. 1 illustrates a conventional local area network (LAN) including a multi-port bridge 10. The multi-port bridge 10 in this example has eight ports #1–8, though the number of ports can vary. Each port #1–8 is connected to a segment 11–18 of the LAN. Each segment 11–18 typically includes one or more nodes 19–34, such as a workstation, a personal computer, a data terminal, a file server, a printer, a facsimile, a scanner or other conventional digital device. Each of the nodes 19–34 has an associated node address which uniquely identifies the node. The nodes 19–34 are configured to send data, one to another, in the form of data packets.

Figure 2:
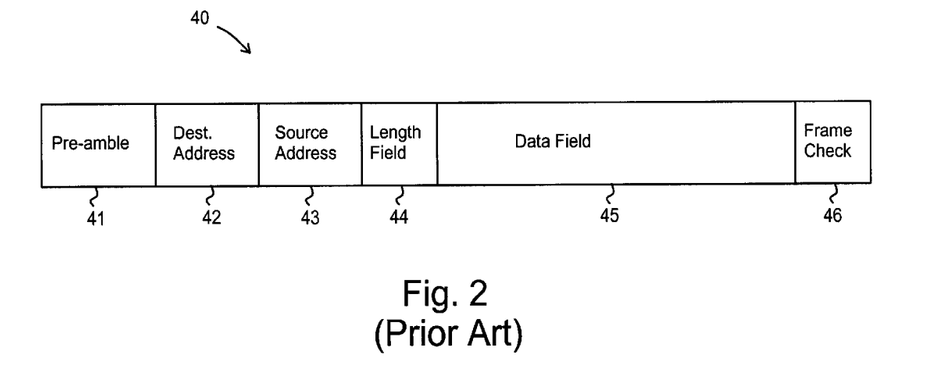
FIG. 2 illustrates a conventional IEEE 802.3 data packet.

When the LAN operates according to Ethernet standards, such as the Institute of Electrical and Electronics Engineers (IEEE) 802.3 standard, data is communicated in the form of discrete packets. FIG. 2 illustrates a conventional IEEE 802.3 data packet 40. The data packet 40 includes an eight byte long pre-amble 41 which is generally utilized for synchronizing a receiver to the data packet 40. The pre-amble 41 includes seven bytes of pre-amble and one byte of start-of-frame. Following the pre-amble 41, the data packet 40 includes a six byte long destination address 42, which is the node address of a node which is an intended recipient for the data packet 40. Next, the data packet 40 includes a six byte long source address 43, which is the node address of a node which originated the data packet 40. Following the source address 43 is a length field 44. Following the length field is a data field 45. The data field 45 can be up to 1500 bytes long. Finally, the data packet 40 includes a four-byte frame check field 46 which allows a recipient of the data packet 40 to determine whether an error has occurred during transmission of the data packet 40.

When a node (source node) sends data to another node (destination node) located on the same segment of the LAN (intra-segment communication), the data is communicated directly between the nodes without intervention by the multi-port bridge 10 and is known as an intra-segment packet. Therefore, when the multi-port bridge 10 receives an intra-segment packet, the multi-port bridge 10 does not bridge the packet (the packet is filtered). When a node (source node) sends a data packet to another node (destination node) located on a different segment (inter-segment communication), however, the multi-port bridge 10 appropriately forwards the data packet to the destination node.

When a node (source node) sends data to another node (destination node) located on the same segment of the LAN (intra-segment communication), the data is communicated directly between the nodes without intervention by the multi-port bridge 10. Therefore, when the multi-port bridge 10 receives an intra-segment packet, the multi-port bridge 10 does not bridge the packet (the packet is filtered). When a node (source node) sends a data packet to another node (destination node) located on a different segment (inter-segment communication), however, the multi-port bridge 10 appropriately forwards the data packet to the destination node.

Data packets received by the multi-port bridge 10 are generally stored temporarily within the multi-port bridge 10 before being forwarded to the appropriate destination node by the multi-port bridge 10. Problems can arise, however, when the capabilities of the multi-port bridge are exceeded by network demand. When data packets are received by the multi-port bridge 10 at a rate that is higher than the rate at which the multi-port bridge 10 can appropriately forward the packets, the network becomes congested. This problem is exacerbated as network users place increasing demands on the network.

Therefore, what is needed is improved technique for controlling the flow of data in a multi-port bridge for a local area network.

SUMMARY OF THE INVENTION

The invention is a method and apparatus for controlling flow of data packets among the ports of a multi-port bridge. The multi-port bridge includes a switch engine, a dynamic random access memory and a plurality of ports, all of which are interconnected by a high speed communication bus. The switch engine includes a memory controller and a bus controller, each being a finite state machine. The bus controller controls access to the communication bus by collecting requests from the ports and granting the requests according to an appropriate priority. The memory controller provides an interface between the memory and the communication bus. The memory includes look-up tables utilized for appropriately directing data packets among the ports, packet buffers utilized for temporarily storing packets and mailboxes for providing an interface between the switch engine and an external processor.

Each port includes a port controller, a MAC transceiver, a receive buffer, a transmit buffer and a triplet buffer. Packets received from a LAN segment by the transceiver are directed to the communication bus through the receive buffer, while packets to be transmitted over the LAN segment are directed to the transceiver through the transmit buffer. The triplet buffer stores memory pointers, referred to herein as "triplets," for data packets being queued in the packet buffers of the memory.

A data packet originating from a node (source node) in a segment of the LAN is received by the receive buffer of a corresponding one of the ports (source port) of the multi-port bridge. As the packet is still being received, the look-up tables are utilized to determine which is the appropriate destination port for the packet based upon the destination address. A result of performing the look-up is a "triplet" which includes three fields: a first field containing the identification of the source port, a second field containing the identification of the destination port, and a third field containing a starting address assigned to the incoming packet in the packet buffers of the memory.

If the source port and the destination port are the same, this indicates that the source and destination nodes are on the same segment of the LAN (intra-segment communication) and the packet is filtered. Otherwise, the memory controller places the triplet on the communication bus which is monitored by each port. If the port identified as the destination port in the triplet is not currently busy transmitting or receiving another packet, the destination port will configure itself to receive the packet directly from the source port (cut-through).

However, if the triplet buffer in the port identified as the destination port in the triplet is nearly full, the bus controller of the destination port applies a jam request signal to the communication bus. The source port will receive the jam request and, in response, will discard the incoming packet and also send a jam signal over its associated segment. The jam signal will cause the node (source node) which is the source of the packet to discontinue sending the packet and attempt to resend the packet after a waiting period.

Once the triplet has been formed, the packet is loaded from the receive buffer of the source port into the packet buffers in the memory starting at the memory address identified by the third field of the triplet. Writing of the packet into the packet buffers preferably occurs as the remainder of the packet is still being received into the receive buffer of the source port. For this reason, the receive buffer for each port need not be capable of storing the entire data packet. In addition, if the destination port is configured for cut-through, the destination port will receive the packet into its transmit buffer directly from the communication bus simultaneously with the write cycles for loading of the packet into the packet buffers. During such a cut-through operation, the packet is received into a transmit buffer of the destination port for immediate transmission to the LAN segment associated with the destination port.

Once the entire packet has been loaded into the packet buffers, the triplet is again placed on the data lines of the communication bus. The destination port then stores the triplet in its triplet buffer. Thus, the packet is queued for transmission by the destination port. Then, when the destination port is no longer busy, the destination port retrieves the packet from the packet buffers.

While the destination port is receiving the packet into its transmit buffer from the packet buffers or directly from the source port, the destination port begins transmitting the packet to the LAN segment associated with the destination port. For this reason, the transmit buffer for each port need not be capable of storing an entire data packet The packet is then received from the LAN segment by the destination node for the packet.

A limited number of bus commands are utilized for controlling the flow of packets through the multi-port bridge. In comparison to prior systems, the throughput capacity of the multi-port bridge is improved.

DETAILED DESCRIPTION OF A PREFERRED EMBODIMENT

The following documents are hereby incorporated by reference: U.S. patent application Ser. No. 08/590,125, filed Jan. 23, 1996; U.S. patent application Ser. No. 08/371,499, filed Jan. 11, 1995; U.S. patent application Ser. No. 08/947,081, filed Oct. 8, 1997; U.S. patent application Ser. No. 08/946,866, filed Oct. 8, 1997; U.S. patent application Ser. No. 09/025,356, filed Feb. 18, 1998, and entitled, "HIGH SPEED BUS STRUCTURE IN A MULTI-PORT BRIDGE FOR A LOCAL AREA NETWORK"; and U.S. patent application Ser. No. 09/025,355, filed Feb. 18, 1998, and entitled, "MEMORY CONTROLLER IN A MULTI-PORT BRIDGE FOR A LOCAL AREA NETWORK".

In the preferred embodiment, the present invention is utilized for appropriately directing data packets through a multi-port bridge for an Ethernet LAN. It will be apparent, however, that other devices in an Ethernet LAN, such as a switch or a router, or devices in a network operating according to another networking standard, can utilize the advantages of the present invention.

Figure 3:
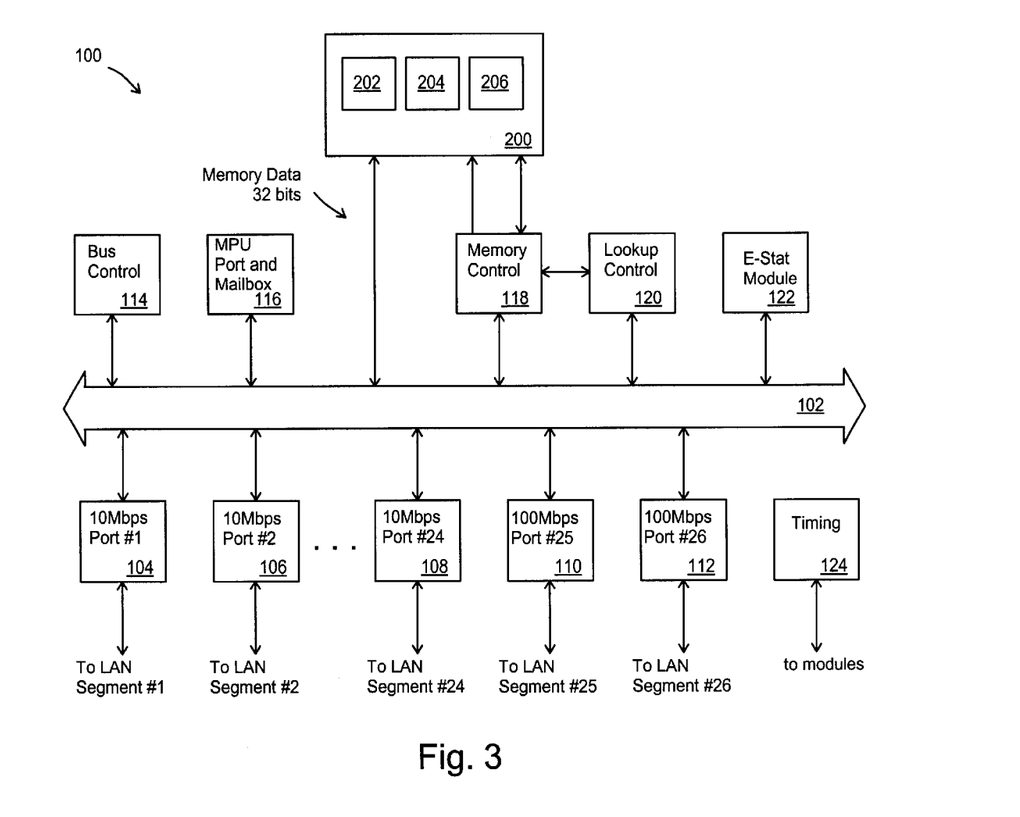
FIG. 3 illustrates a block schematic diagram of a multi-port bridge according to the present invention.

FIG. 3 illustrates a block schematic diagram of a multi-port bridge 100 according to the present invention. A high speed communication bus 102 provides an interconnection for each of the functional blocks 104–124 of the multi-port bridge 100. The communication bus 102 preferably includes five command lines and thirty-two data lines, though it will be apparent that other bus configurations can be utilized. Twenty-four 10 Mbps ports 104–108 and two 100 Mbps ports 110–112 are each coupled to the communication bus 102 and can be coupled to a respective LAN segment, each LAN segment having one or more nodes. Each of the twenty-four 10 Mbps ports 104–108 transmit and receive data packets at a rate of 10 Mbps, whereas, the two 100 Mbps ports 110–112 transmit and receive data packets at a rate of 100 Mbps. It will be apparent, however, that other numbers of ports and other port configurations can be utilized.

A bus control module 114 controls access to the communication bus 102 by collecting requests from the ports 104–112 and from the other modules. Based upon the requests, the bus control module 114 grants access to the communication bus 102 according to an appropriate priority. The bus control module 114 also controls access to a memory device 200 by an external processor (MPU), as explained in more detail herein. An MPU port and mailbox module 116 provides an interface between the multi-port bridge 100 and the external processor 400 (FIG. 6) for performing various functions, as will also be explained in more detail herein. These functions include loading data into registers of the multi-port bridge 100, fetching data from registers of the multi-port bridge 100 and transferring data packets between the external processor 400 and the ports 104–112 of the multi-port bridge 100.

A memory control module 118 provides an interface between the memory device 200 and the communication bus 102 and also provides an interface between the memory device 200 and a look-up control module 120. The memory device 200 includes mailboxes 202 for exchanging information between the external processor 400 and the multi-port bridge 100. In addition, the memory device includes look-up tables 204. The look-up tables 204 include entries which indicate which port of the multi-port bridge 100 is associated with each node of the LAN. The look-up tables 204 are utilized for appropriately directing data packets received by the multi-port bridge 100 among the ports 104–112.

The look-up control module 120 receives addresses of nodes and associated port identifications from the communication bus 102. These addresses and identifications are stored in the look-up tables 204. The look-up control module 120 facilitates utilizing the look-up tables 204 for directing packets among the ports 104–112 based upon the destination address of each packet. The memory device 200 also includes packet buffers 206 for temporarily storing data packets that are being directed through the multi-port bridge 100. The memory device 200 is preferably an SDRAM device, though other types of memory devices can be utilized, such as DRAM, SRAM, RAM or EDO. In the case of dynamic memory, the memory control module 118 refreshes the memory device 200 as required.

An E-stat module 122 collects data packet routing statistics and provides them to the external processor 400 for performing analysis and network management functions. A timing module 124 provides timing signals to the ports 104–112 and to the other modules 114–122 of the multi-port bridge 100. Preferably, a primary clock signal cycles at 40 MHz. Other clock signals at 10 MHz and 25 MHZ are derived from the primary clock signal.

Preferably, the modules 114–124 are each implemented as a finite state machine, though the modules 114–124 can alternately be implemented as one or more processors operating according to stored software programs. Finite state machines are preferred as they can generally perform the necessary operations faster, thus, resulting in a higher packet handling bandwidth for the multi-port bridge 100.

Figure 4:
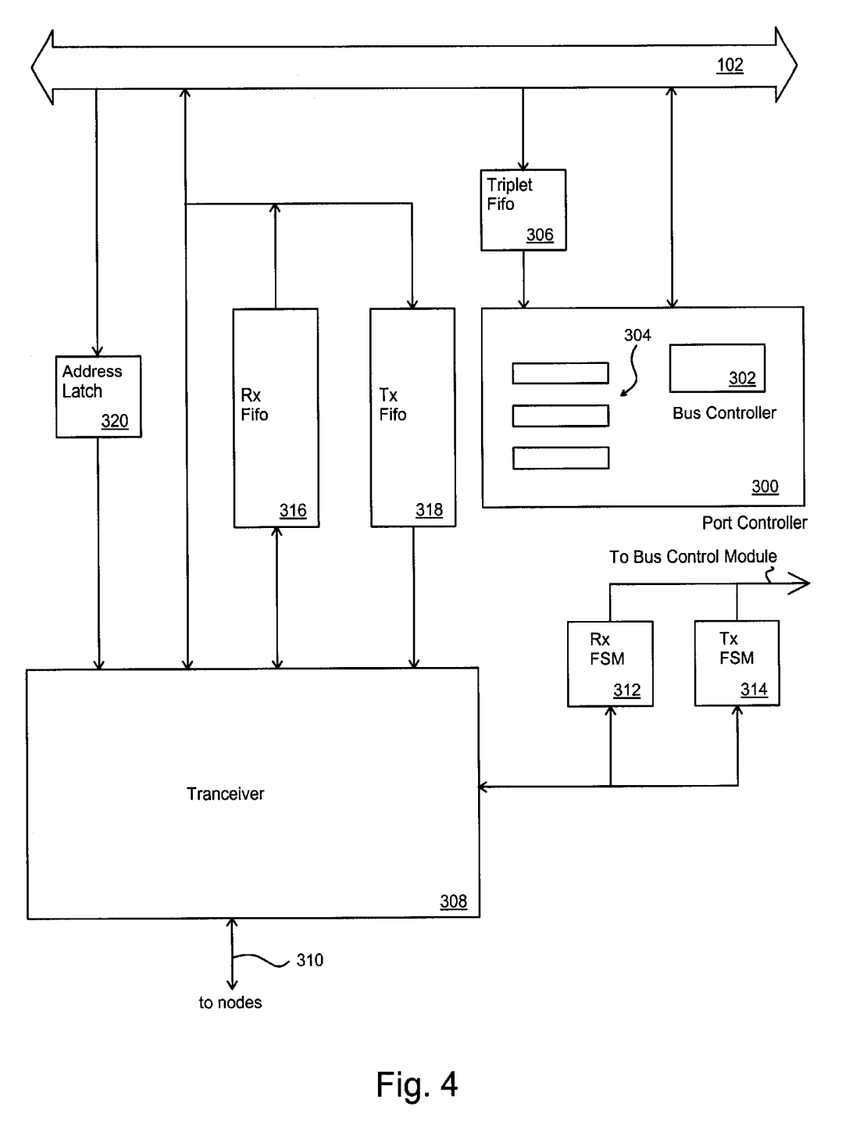
FIG. 4 illustrates a block schematic diagram of a port of the multi-port bridge according to the present invention.

FIG. 4 illustrates a block schematic diagram of one of the ports 104–112 of the multi-port bridge 100. A port controller 300, including a bus interface 302 and registers 304, provides control for the port and an interface between the port and the communication bus 102. The port controller 300 monitors the communication bus 102 for commands and data directed to the port and also provides commands to the communication bus 102 at times when the port has control of the communication bus 102. The registers 304 contain data for initializing the port upon start-up and for collecting status information for the port. The port also includes a triplet FIFO buffer 306 coupled between the communication bus 102 and the port controller 300. The triplet buffer 306 stores memory pointers ("triplets"—explained in more detail herein) for data packets being queued in the packet buffers 206 (FIG. 3) of the memory device 200. Preferably, the triplet buffer 306 holds 128 triplets, each triplet preferably being four bytes long.

The port also includes a medium access control (MAC) transceiver 308 which accesses a LAN segment 310 for transmitting and receiving data packets to and from the LAN segment 310. Associated with the transceiver 308 are a receive finite state machine 312, for controlling the transceiver 308 during packet reception, and a transmit finite state machine 314, for controlling the transceiver 308 during packet transmission. The receive finite state machine 312 and the transmit finite state machine 314 are each coupled to the bus control module 114 for requesting access to the communication bus 102 therefrom (FIG. 3).

Packets received from the LAN segment 310 by the transceiver 308 are directed to the communication bus 102 through a receive FIFO buffer 316, while packets to be transmitted over the LAN segment 310 are directed from the communication bus 102 to the transceiver 308 through a transmit FIFO buffer 318. Preferably, the receive buffer 316 holds 128 bytes while the transmit buffer 318 holds 256 bytes. Note that an IEEE 802.3 data packet can include up to 1500 bytes of data in addition to the source address, the destination address and the frame check field. Thus, in the preferred embodiment, neither the receive buffer 316, nor the transmit buffer 318 is capable of storing a entire IEEE 802.3 data packet of the maximum size. An address latch 318 is also included in the port for latching addresses from the communication bus 102 and providing them to the transceiver 308.

A data packet, such as an IEEE 802.3 data packet, originating from a node (source node) in a segment of the LAN is received by a corresponding one of the ports 104–112 (source port) of the multi-port bridge 100. The receive buffer 316 in the source port receives the data packet as the packet is being received by the transceiver 308 in the source port from the LAN segment associated with the source port. After the first twelve bytes, corresponding to the source address and the destination address for the packet, are received, the receive finite state machine 312 requests a look-up cycle from the bus control circuit 114 (FIG. 3) by raising an interrupt request line coupled to the bus control module 114. The bus control module 114 monitors such requests and grants each request according to an appropriate priority. Upon granting the request, the bus control module 114 notifies the source port by placing a bit pattern identifying a bus grant on the command lines of the communication bus 102 and a bit pattern uniquely identifying the source port on the data lines of the communication bus 102.

The first four bytes of the destination address for the packet are then placed from the receive buffer 316 of the source port onto the data lines of the communication bus 102, while a corresponding bit pattern is placed on the command lines of the communication bus 102 by the bus interface 302 of the source port. The look-up control module 120 (FIG. 3) receives the first four bytes of the destination address. Then, the source port places the last two bytes of the destination address for the packet and the first two bytes of the source address for the packet on the data lines of the communication bus 102 and places a corresponding bit pattern on the command lines of the communication bus 102. The look-up control module 120 receives these four bytes. Finally, the source port places the last four bytes of the source address for the packet on the data lines of the communication bus 102 and places a corresponding bit pattern on the command lines. The look-up control module 120 also receives these four bytes. Thus, the destination address and source address are transferred over the communication bus 102 in segments that are each four bytes long as this corresponds to the width (32 bits) of the data lines of the communication bus 102. It will be apparent, however, that the communication bus 102 can have a different number of data lines, in which case, a different number of bytes can be transferred at a time.

Once the look-up control module 120 has received the destination address and the source address for the packet, the look-up control module 120 so notifies the memory control module 118 (FIG. 3). The memory control module 118 then updates the look-up tables 204 (FIG. 3) by ensuring that the source address for the packet is stored in the look-up tables 204 in association with the identification of the source port for the packet. This ensures that the look-up tables 204 accurately reflect any changes that may have occurred in the LAN (referred to as a learning cycle). The information stored during the learning cycle is utilized for directing subsequent packets.

Figure 5:
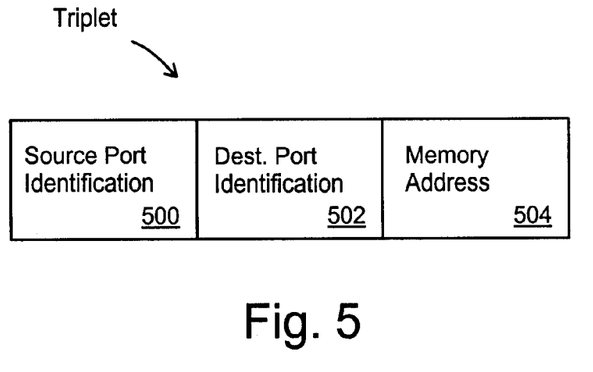
FIG. 5 illustrates a "triplet" according to the present invention, including a first field containing an identification of a source port, a second field containing an identification of a destination port, and a third field containing a memory address.

Once the learning cycle is complete, the memory control 118 module utilizes the look-up tables 204 to determine which port (destination port) is associated with the destination address for the packet. As a result of performing the look-up cycle, the memory control module 118 forms a bit pattern referred to as a "triplet". FIG. 5 illustrates the triplet which includes three fields: a first field 500 containing the identification of the source port, a second field 502 containing the identification of the destination port, and a third field 504 containing a starting address assigned to the incoming packet in the packet buffers 206 of the memory device 200. The first field 500 and the second field 502 are each preferably one byte long, while the third field 504 is preferably two bytes long. It will be apparent, however, that the ordering of the fields of the triplet and the size of each field can be altered. If the source port and the destination port identified by the triplet are the same, this indicates that the source and destination nodes are on the same segment of the LAN (intra-segment communication) and, therefore, the packet does not need to be bridged. In such case, no further action is taken relative to the packet (the packet is filtered).

Otherwise, the memory control module 118 places the triplet on the data lines of the communication bus 102 and places a bit patten indicating that an "initial triplet" is ready on the command lines. Each port monitors the communication bus 102. If the port identified as the destination port in the triplet is not currently busy transmitting or receiving another packet, the destination port will configure itself to receive the packet directly from the source port (cut-through). Alternately, if the triplet buffer 306 in the port identified as the destination port in the triplet is nearly full, the bus controller 302 of the destination port applies a jam request signal to the command lines of the communication bus 102. The source port will receive the jam request and, in response, will discard the incoming packet and also send a jam signal over its associated segment. The jam signal will cause the node (source node) which is the source of the packet to discontinue sending the packet and attempt to resend the packet after a waiting period.

As illustrated in FIG. 5, the triplets are preferably of a uniform size. Therefore, the exact number of triplets that can be accommodated by a triplet buffer 306 of a port can be determined from the amount of space available in the triplet buffer 306 of the port. Accordingly, unlike prior arrangements, extra space does need to be provided in the port to accommodate a data packet having an unknown length. According to the present invention, however, the jam request is preferably generated by a destination port for a packet when the triplet buffer 306 in the port has space available to store several triplets (e.g. ten triplets). This provides the destination port an ability to store triplets for packets which are in the process of being loaded into the packet buffers 206. The triplet buffer 306 in each port is preferably sized relative to the associated packet buffers 206 in the memory device 200 such that there is little or no possibility that the packet buffers 206 will become full before any triplet buffer 306 becomes full.

Once the triplet has been placed on the communication bus 102, the source port initiates a series of memory write cycles for loading the packet from the receive buffer 316 of the source port into the packet buffers 206 in the memory device 200 starting at the memory address identified by the third field of the triplet. Preferably, the packet buffers 206 include a space allocated to each port for storing packets received by the port. Alternately, the space is allocated to each port for storing packets to be transmitted by the port; it should be noted, however, that only one and not both types of allocated space need be provided. Packets are written into the space allocated to the port in the packet buffers 206 in a circular fashion; each new packet will overwrite portions of the oldest packet in the allocated space.

The packet is preferably loaded into the packet buffers 206 a predetermined offset from the assigned address. This provides a location for storing a header for the packet once the packet has been completely loaded into the packet buffers 206. For example, the header can include an identification number assigned to the packet, the triplet for the packet and a receive status for the packet. The receive status indicates whether or not the entire packet has been successfully received and loaded into the packet buffer 206.

Multiple memory write cycles are generally needed to transfer the entire packet into the packet buffers 206 as the remaining portions of the packet will generally include more than thirty-two bits (the number of data lines in the communication bus 102). Writing of the packet in the packet buffers 206 preferably occurs as the remainder of the packet is still being received into the receive buffer 316 of the source port. For this reason, the receive buffer 316 for each port need not be capable of storing an entire data packet. In addition, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into a transmit buffer 318 of the destination port for immediate transmission to the LAN segment associated with the destination port.

Once the entire packet has been loaded into the packet buffers 206, the memory control module 118 again places the triplet on the data lines of the communication bus 102 and places a bit pattern on the command lines identifying this as the "final triplet." It should be noted that the initial triplet and the final triplet are preferably identical, while the bit patterns placed on the command lines of the communication bus 102 for identifying each of the initial and final triplet are distinct. The destination port will then store the final triplet in the triplet buffer 306 located within the destination port. Thus, the packet is queued for transmission by the destination port.

Then, when the destination port is no longer busy, the destination port will retrieve the packet from the packet buffers 206. This is accomplished by the destination port requesting access to the communication bus 102 from the bus control module 114. When the request is granted, the bus control module 114 places a bit pattern indicating a bus grant on the command lines of the communication bus 102 and a bit pattern identifying the port on the data lines. Once the destination port gains control of the communication bus 102, the destination port then initiates a series of read operations over the communication bus 102 by placing the starting address in the packet buffers 206 of the packet (from the third field of the triplet for the packet) on the data lines of the communication bus 102 and places a bit pattern identifying a memory read operation on the command lines. In response, the memory control module 118 accesses the packet in the packet buffers 206. Preferably, the destination port checks the receive status for the packet. If the receive status indicates that the packet was not received successfully, the memory read operation is preferably halted and no further action is taken relative to the packet.

In addition, in the event that a cut-through operation was initiated, but was unsuccessful, the packet will need to be retransmitted by the destination port. For example, the cut-through operation may have been unsuccessful if a data collision occurred during its transmission over the segment associated with the destination port. In such case, the packet is retrieved from the packet buffers 206 as described above.

While the destination port is receiving the packet into its transmit buffer 318 from the packet buffers 206 or directly from the source port (as during cut-through), the destination port begins transmitting the packet to the LAN segment associated with the destination port under control of the transmit finite state machine 314. For this reason, the transmit buffer 318 for each port need not be capable of storing an entire data packet. The packet is then received from the LAN segment by the destination node for the packet.

Figure 6:
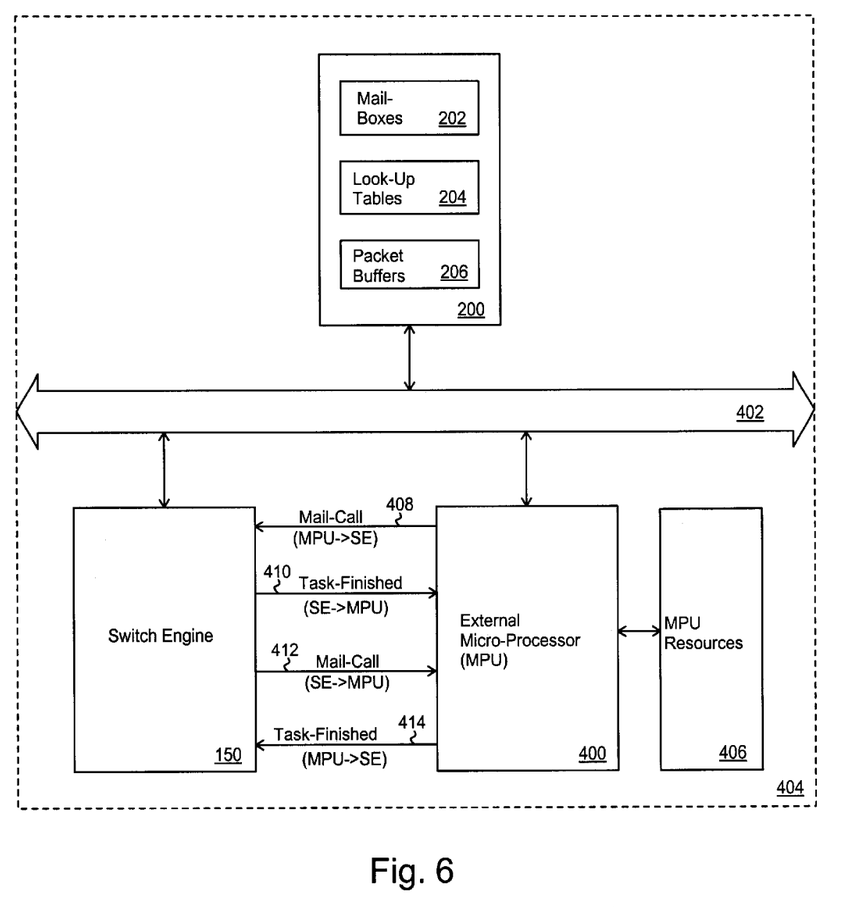
FIG. 6 illustrates a block schematic diagram of the switch engine, a memory device and an external processor according to the present invention.

FIG. 6 illustrates a block schematic diagram of the switch engine 150 of the multi-port bridge 100, the memory device 200 and an external processor 400 according to the present invention. The switch engine 150 includes the bus control block 114, the MPU port and mailbox 116, the memory control block 118 and the look-up control block 120 illustrated in FIG. 3. A memory bus 402 interconnects the switch engine 150 and the external processor 400 to the memory device 200. Preferably, access to the memory device 200 by the switch engine 150 and the external processor 400 is implemented by a multiplexor included as part of the memory bus 402 and which multiplexor is controlled by the switch engine 150. The multi-port bridge 100, including the communication bus 102 (FIG. 3), is preferably implemented as an integrated circuit mounted to a printed circuit board 404. The memory device 200 and the external processor 400 are also mounted to the printed circuit board 404.

As described above in reference to FIGS. 3–5, the bridging and filtering functions of the multi-port bridge are performed primarily by the switch engine 150 and the buffer memory 200. Because the switch engine 150 and ports 104–112 are preferably implemented as a number of finite state machines interconnected via a communication bus 102, the multi-port bridge 100 provides a high bandwidth capacity for directing data packets through the multi-port bridge 100. Thus, according to the present invention, the external processor 400 is provided to perform tasks in support of the functioning of the multi-port bridge 100. These functions include: providing a communication port for enabling the nodes of the LAN to communicate with nodes of a dissimilar LAN or a WAN and for enabling the nodes of the LAN to communicate with a file server for the LAN; providing parameters for initializing registers of the switch engine; collecting data from the LAN for performing network management functions; and providing services to the switch engine. The mailbox interface according to the present invention allows the external processor 400 to provide these functions without the need to dedicate a large number of pins of the integrated circuit package to such an interface.

Preferably, the external processor 400 is implemented as a reduced instruction set computer (RISC) to improve speed performance. The external processor 400 can have its own dedicated resources 406, such as memory for storing operating software for the external processor 400 and for use by the external processor 400 as a scratch pad. In addition, when the external processor 400 performs the functions of a file server for the LAN, the resources 406 can include a mass storage device for storing application programs and data files which is accessible by the external processor 400. Also, when the external processor 400 performs the function of providing an interconnection of the LAN to a dissimilar LAN or to a WAN, the resources 406 can include a communication device, such as a telephone modem, an integrated services digital network (ISDN) interface, a T1 media interface or a T3 media interface which is accessible by the external processor 400. In addition, multiple external processors 400 can be coupled to the memory bus 402. In such case, additional resources can be provided for such multiple external processors, such as one or more mass storage devices and/or one or more communication devices.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A method of controlling the flow of data packets in a multi-port bridge having a plurality of ports interconnected to a memory device by a communication bus, the multi-port bridge for interconnecting a plurality of segments of a local area network, the method comprising steps of:

a. receiving a data packet into a receive buffer in a source port for the packet, the packet having a destination address, a source address and a data field and the packet being received from a segment associated with the source port;

b. looking up the destination address in a table for determining a destination port for the packet;

c. assigning a location in the memory device to the packet;

d. forming a triplet for the packet wherein the triplet includes a first field for identifying the source port, a second field for identifying the destination port, and a third field for identifying the location assigned to the packet in the memory device;

e. placing the triplet on the communication bus a first time;

f. loading the packet into the memory device at the location in the memory device assigned to the packet;

g. placing the triplet on the communication bus a second time;

h. storing the triplet in a triplet buffer in the destination port;

i. receiving the packet into a transmit buffer in the destination port from the location assigned to the packet in the memory device; and j. transmitting the packet to a segment associated with the destination port for the packet.

2. The method according to claim 1 wherein the step of looking up the destination address is performed while the data field is being received by the source port.

3. The method according to claim 1 wherein the step of loading the packet into the memory device is performed while the data field is being received by the source port.

4. The method according to claim 1 wherein the step of transmitting the packet is performed while the data field is being received from the memory device by the destination port.

5. A multi-port bridge for interconnecting a plurality of segments of a local area network, the multi-port bridge comprising:

a. a communication bus;

b. a memory device coupled to the communication bus;

c. a source port coupled to the communication bus, wherein the source port receives a packet from a source node within a segment of the local area network associated with the source port, wherein the source port initiates a look-up cycle upon receiving an address of a destination node for the packet and wherein a product of the look-up cycle is a triplet having a first field for identifying the source port, a second field for identifying a destination port for the packet, and a third field for identifying a location assigned to the packet in the memory device; and d. the destination port for transmitting the packet to the destination node within a segment of the local area network associated with the destination port wherein if the destination port is not busy, the destination port receives the packet directly from the source port after the triplet is placed on the communication bus a first time, and if the destination port does not receive the packet directly from the source port, the destination port receives the packet from the memory device after the triplet is placed on the communication bus a second time.

6. The apparatus according to claim 5 wherein packet is stored in the memory device between the first time the triplet is placed on the communication bus and the second time the triplet is placed on the communication bus.

7. The multi-port bridge according to claim 5 wherein the source port comprises a receive buffer for receiving the data packet.

8. The multi-port bridge according to claim 7 wherein the data packet has a maximum expected size and the receive buffer is smaller than the maximum expected size.

9. The multi-port bridge according to claim 5 wherein the destination port comprises a transmit buffer for transmitting the data packet.

10. The multi-port bridge according to claim 9 wherein the data packet has a maximum expected size and the transmit buffer is smaller than the maximum expected size.

11. A method of controlling flow of packets in a multi-port bridge having a plurality of ports interconnected to a memory device by a communication bus, the multi-port bridge for interconnecting a plurality of segments of a local area network, the method comprising steps of:

a. receiving a packet having a destination address from a segment associated with a source port for the packet into a receive buffer in the source port;

b. looking-up the destination address in a table for determining a destination port for the packet;

c. assigning a location in the memory device to the packet;

d. forming a triplet for the packet wherein the triplet comprises a first field for identifying the source port, a second field for identifying a destination port for the packet, and a third field for identifying a location assigned to the packet in the memory device;

e. placing the triplet on the communication bus a first time;

f. loading the packet into the memory device at the location assigned to the packet; and g. determining whether the destination port is available to receive the packet directly from the source port and, if the destination port is available to receive the packet directly from the source port, performing a step of receiving the packet into a transmit buffer in the destination port simultaneously with loading the packet into the memory device, and if the destination port is not available to receive the packet directly from the source port, receiving the packet into the destination port from the memory after the destination port is available to receive the packet.

12. The method according to claim 11 further comprising a step of placing the triplet on the communication bus a second time after the step of loading is completed.

13. The method according to claim 12 further comprising a step of storing the triplet in the destination port during the step of placing the triplet on the communication bus a second time.

14. The method according to claim 11 further comprising a step of transmitting the packet performed while the packet is being received into the transmit buffer of the destination port.

15. The method according to claim 11 wherein the packet also has a data field and wherein the step of looking-up the destination address is performed while the data field is being received by the source port.

16. The method according to claim 11 wherein the step of loading the packet into the memory device is performed while the data field is being received by the source port.

17. The method according to claim 11 further comprising a step of transmitting the packet performed while the packet is being received from the memory device by the destination port.

* * * * *